US006084460A

United States Patent [19]

Takeuchi

[11] Patent Number: 6,084,460

[45] Date of Patent: Jul. 4, 2000

[54] FOUR QUADRANT MULTIPLYING CIRCUIT DRIVEABLE AT LOW POWER SUPPLY VOLTAGE

[75] Inventor: Takanobu Takeuchi, Tokyo, Japan

[73] Assignee: Mitsubishi Denki Kabushiki Kaisha, Tokyo, Japan

[21] Appl. No.: 09/207,658

[22] Filed: Dec. 9, 1998

[30] Foreign Application Priority Data

Aug. 14, 1998 [JP] Japan .................................. 10-229738

[51] Int. Cl.[7] ........................................................ G06F 7/44

[52] U.S. Cl. ........................... 327/357; 327/359; 455/333

[58] Field of Search ..................................... 327/356, 357, 327/359, 116, 119–122; 455/326, 333

[56] References Cited

U.S. PATENT DOCUMENTS

| | | | |
|---|---|---|---|
| 4,546,275 | 10/1985 | Pena-Finol et al. | 327/357 |
| 5,097,156 | 3/1992 | Shimabukuro et al. | 327/357 |
| 5,115,409 | 5/1992 | Stepp | 327/357 |
| 5,656,964 | 8/1997 | Liu | 327/357 |

*Primary Examiner*—Kenneth B. Wells
*Attorney, Agent, or Firm*—Oblon, Spivak, McClelland, Maier & Neustadt, P.C.

[57] ABSTRACT

A four quadrant multiplying circuit includes a first compression circuit having a PMOS differential input structure for reducing and outputting a first input voltage and a reference voltage by a predetermined ratio; a second compression circuit having an NMOS differential input structure for reducing and outputting a second input voltage and a reference voltage by a predetermined ratio; a current converting circuit for converting a constant current input from a constant-current circuit to a first and a second constant current on the basis of the second input voltage and reference voltage reduced by a predetermined ratio and output by the second compression circuit; first and second voltage converting circuits. The first and second constant currents output by the current converting circuit are received by the device sources, and the outputs of the first and second voltage compression circuits are received by the device gates. A Gilbert cell for multiplying together the outputs from the first and second voltage converting circuits and outputting the multiplied voltage is also used.

4 Claims, 8 Drawing Sheets

FOUR QUADRANT MULTIPLYING CIRCUIT DRIVEABLE AT LOW POWER SUPPLY VOLTAGE

BACKGROUND OF THE INVENTION

1. Field of the Invention

The present invention relates to a four quadrant multiplying circuit that can be driven at a low power supply voltage.

2. Background Art

A multiplying circuit is one of the commonly known integrated circuits which are used in many fields, particularly, modulating and demodulating circuits.

The output Z from the multiplying circuit satisfies the relationship Z=K·XY (K=constant) with respect to inputs X and Y. In particular, a multiplying circuit which satisfies the above relationship including signs, regardless of whether the inputs X and Y are positive or negative, is called a four quadrant multiplying circuit.

FIG. 7 is a circuit diagram of a conventional four quadrant multiplying circuit 400. In the following description, the gate voltage of a P-channel or N-channel MOSFETn (n: reference number; same applies hereinafter) is expressed as $Vg_n$; the source voltage thereof is expressed as $Vs_n$; the gate-source voltage thereof is expressed as $Vgs_n$; and the drain current thereof is expressed as $Id_n$. The threshold voltage of a P-channel MOSFETn is expressed as $Vth(P)_n$ and the threshold voltage of an N-channel MOSFETn is expressed as $Vth(N)_n$. Hereinafter, the P-channel MOSFETn is referred to as PMOSn and the N-channel MOSFETn is referred to as NMOSn. Furthermore, in the drawings, circuits 401 to 407 which perform specific functions are surrounded by a dotted line.

The constant-current circuit 407 is constituted by PMOS 1, 2, 3 and 5. PMOS 2, 3 and 5 form a current mirror with PMOS 1, and each output a uniform drain current $ld_2$, $ld_3$ and $Id_5$, respectively. The drain current $ld_2$ from PMOS 2 is supplied to the source of PMOS 11 and 12. The drain current $ld_3$ from PMOS 3 is supplied to the source of PMOS 40, 41, 42 and 43. The drain current from PMOS 5 is supplied to the source of PMOS 17 and 18.

The P-channel voltage compression circuit 401 is constituted by PMOS 11, 12, 13 and 14 and it reduces the voltage of an input voltage Vin(a) from an input signal source 51 and a reference voltage Vref1 outputs from a reference voltage power supply 59 (where Vref1=½ Vcc) by a predetermined ratio, and outputs source voltages $Vs_{13}$ and $Vs_{14}$, obtained by compressing the voltage difference vin(a) between input voltage Vin(a) and reference voltage Vref1, to the gates of PMOS 20 and 23 and PMOS 21 and 22.

The P-channel voltage compression circuit 402 is constituted by PMOS 15, 16, 17 and 18, and it reduces the voltage of an input voltage Vin(b) from an input signal source 51 and a reference voltage Vref1 output from a reference voltage power supply 59 by a predetermined ratio, and output source voltages $Vs_5$ and $Vs_{16}$, obtained by compressing the voltage difference vin(b) between input voltage Vin(b) and reference voltage Vref1, to the gates of PMOS 42 and 43 and PMOS 40 and 41.

The current converting circuit 406 is constituted by PMOS 40, 41, 42 and 43 and it converts the uniform drain current $ld_3$ output by PMOS 3 in accordance with the input voltage Vin(b) and then outputs the converted current. The drain current $ld_{40}$ from PMOS 40 is input to the source of PMOS 20 and 21. The drain current $ld_{41}$ from PMOS 41 is input to the source of PMOS 24 and 25. The drain current $ld_{42}$ from PMOS 42 is input to the source of PMOS 26 and 27. The drain current $ld_{43}$ from PMOS 43 is input to the source of PMOS 22 and 23.

A first voltage converting circuit 403 is constituted by PMOS 20, 21 and diffused resistances 53 and 54, and it amplifies the difference between the source voltage $Vs_{13}$ and $Vs_{14}$ output by the aforementioned P-channel voltage compression circuit 401 and outputs the result to the gates of PMOS 24 and 25.

A second voltage converting circuit 404 is constituted by PMOS 22 and 23 and diffused resistances 57 and 58 and it amplifies the difference between the source voltages $Vs_{13}$ and $Vs_{14}$ output by the aforementioned P-channel voltage compression circuit 401 and outputs the result to the gates of PMOS 26 and 27.

A Gilbert cell 405 is constituted by PMOS 24, 25, 26 and 27 and diffused resistances 55 and 56. The Gilbert cell 405 multiplies the outputs of the first voltage converting circuit 403 and second voltage converting circuit 404, and outputs the result of this multiplication as the difference between the output voltage Vout(+) in diffused resistance 55 and the output voltage Vout(−) in diffused resistance 56.

FIG. 8 is a graph showing drain current Id and drain-source voltage Vds characteristics for a MOSFET. When the drain-source voltage Vds is below a specific value (|Vgs|−|Vth(P) or Vth(N)|), then the drain current Id rises as the voltage Vds increases. Generally, this region is known as the triode region. Furthermore, when the drain-source voltage Vds is above the aforementioned specific value, the drain current Id has a constant value. This is generally known as the pentode region.

In order that the four quadrant multiplying circuit 400 having the foregoing construction operates properly, it is necessary for all of the MOSFETs making up this circuit 400 to operate in the pentode region.

If PMOS 17 is operating in the pentode region, then a voltage smaller than Vref1+$Vth(P)_{40\ or\ 41}$ will be supplied to the gates of PMOS 40 and 41. Therefore, the drain voltage $Vd_{40}$ of PMOS 40, that is, the source voltages $Vs_{20}$, and $Vs_{21}$ to PMOS 20 and 21, will be smaller than $Vg_{40}$−Vth $(P)_{40}$=Vref1.

If PMOS 18 is operating in the pentode region, then a voltage smaller than Vin(b)+$Vth(P)_{42\ or\ 43}$ will be supplied to the gates of PMOS 42 and 43. Therefore, the drain voltage $Vd_{43}$ from PMOS 43, that is, the source voltages $Vs_{22}$ and $Vs_{23}$ to PMOS 22 and 23 is smaller than $Vg_{43}$−$Vth(P)_{43}$−$Vth(P)_{43}$=Vin(b)=Vref1+vin(b).

If PMOS 11 is operating in the pentode region, then a voltage smaller than Vin(a)+$Vth(P)_{11}$ is supplied to the gates of PMOS 20 and 23.

If PMOS 12 is operating in the pentode region, then a voltage smaller than Vref1+$Vth(P)_{12}$ is supplied to the gates of PMOS 21, 22.

If the reference voltage Vref1 (=½ Vcc) has a small value, then the value of the gate-source voltages $Vgs_{20}$ to $Vgs_{23}$ for PMOS 20 to 23 will also become small, and it will become difficult to make these gate-source voltages $Vgs_{20}$ to $Vgs_{23}$ rise above the threshold voltages $Vth(P)_{20}$ to $Vth(P)_{23}$ such that the PMOS 20 to 23 are activated.

Therefore, with the four quadrant multiplying circuit 400 of conventional construction, it has been difficult to operate at a low power supply voltage Vcc.

SUMMARY OF THE INVENTION

It is an object of the present invention to provide a four quadrant multiplying circuit which is capable of being driven at low power supply voltage Vcc.

The four quadrant multiplying circuit according to the present invention comprises a first voltage compression circuit, formed by a differential amplifier circuit comprising transistors of a first conductor type, for converting a differentially input first input voltage and reference voltage to lower values at a predetermined ratio, reducing the potential difference between the first input voltage and reference voltage and outputting the potential difference; a second voltage compression circuit, formed by a differential amplifier circuit comprising transistors of a second conductor type, for converting a differentially input second input voltage and reference voltage to lower values at a predetermined ratio, reducing the potential difference between the second input voltage and reference voltage and outputting the potential difference; a current converting circuit, comprising transistors of a first conductor type, for outputting a first and a second constant current on the basis of the second input voltage and the reference voltage converted to lower values at a predetermined ratio output by the second voltage compression circuit; a first voltage converting circuit, formed by a differential amplifier circuit comprising two transistors of a first conductor type, wherein the first constant current output by the current converting circuit is received by the sources of the two transistors of a first conductor type, the first input voltage after compression output by the first voltage compression circuit is received by the gate of one of the transistors of a first conductor type, and the reference voltage after compression is received by the gate of the other of the transistors of a first conductor type; a second voltage converting circuit, formed by a differential amplifier circuit comprising two transistors of a first conductor type, wherein the second constant current output by the current converting circuit is received by the sources of the two transistors of a second conductor type, the first input voltage after compression output by the first voltage compression circuit is received by the gate of one of the transistors of a first conductor type, and the reference voltage after compression is received by the gate of the other of the transistors of a first conductor type; and a Gilbert cell for multiplying together the outputs of the first and second voltage converting circuits and outputting the multiplied voltage.

In the aforementioned first four quadrant multiplying circuit, the first voltage converting circuit may comprise a first and a second PMOS, the respective sources of which are connected to the same constant-current supply, wherein the first input voltage is input to the gate of the first PMOS, the source of a third PMOS, of which the drain is earthed and the gate is supplied with a first bias voltage, is connected to the drain of the first PMOS, the reference voltage is input to the gate of the second PMOS, the source of a fourth PMOS, of which the drain is earthed and the gate is supplied with the first bias voltage, is connected to the drain of the second PMOS, and the source voltage of the third PMOS and the source voltage of the fourth PMOS are output as the first input voltage and reference voltage converted to lower values at a predetermined ratio; the second voltage compression circuit may comprise a first and a second PMOS, the respective sources of which are connected to the same constant-current supply, wherein the gate of the first NMOS is connected to the reference voltage power supply, the drain of the first NMOS is connected to the source of a third NMOS, of which the gate is supplied with a second bias voltage and the drain is supplied with a power supply voltage, a second input voltage is input to the gate of the second NMOS, the drain of the second NMOS is connected to the source of a fourth NMOS, of which the gate is supplied with a second bias voltage and the drain is supplied with a power supply voltage, the source voltage of the third NMOS and the source voltage of the fourth NMOS being output as the second input voltage and the reference voltage converted to lower values at a predetermined ratio.

The aforementioned first and second voltage converting circuits may comprise diffused resistances as load resistances, and the Gilbert cell may comprise transistors of a second conductor type having a predetermined on resistance as load resistances.

Moreover, the gates of the transistors of a second conductor type used as load resistances in the Gilbert cell may be provided with an independent power supply which supplies a predetermined voltage.

BRIEF DESCRIPTION OF THE DRAWINGS

DESCRIPTION OF THE EMBODIMENTS OF THE INVENTION (1) First Embodiment (1-1) General Construction Hereinafter, a four quadrant multiplying circuit 100 according to a first embodiment is described. FIG. 1 is a block diagram of the four quadrant multiplying circuit 100. Input voltages Vin(a) and Vin(b) are input from a predetermined power supply. The input voltages Vin(a) and Vin(b) have predetermined potential differences of vin(a) and vin (b) with respect to a reference voltage Vref1 (=½ Vcc). If the input voltage Vin(a) is expressed as Vref1+vin(a) and input voltage Vin(b) is expressed as Vref1+vin(b), then the four quadrant multiplying circuit 100 outputs two output voltages Vout(+) and Vout(−) having potential difference which may be expressed as K×vin(a)×vin(b) (where K is a constant).

FIG. 2 is a circuit diagram of a four quadrant multiplying circuit 100 according to the first embodiment of the present invention. As explained in more detail below, the four quadrant multiplying circuit 100 comprises, as marked by the dotted lines in the diagram, a P-channel voltage compression circuit 101 for reducing the input voltage Vin(a) and the reference voltage Vref1 by a predetermined ratio and for outputting the reduced voltages, an N-channel voltage compression circuit 102 for reducing the input voltage Vin(b) and the reference voltage Vref1 by a predetermined ratio and for outputting the reduced voltages, a first voltage converting circuit 103 for amplifying and outputting the potential difference between the aforementioned reduced input voltage Vin(a) and reference voltage Vref1 output by the aforementioned P-channel voltage compression circuit 101, a second voltage converting circuit 104 for amplifying and outputting the potential difference between the aforementioned reduced input voltage Vin(b) and reference voltage Vref1 output by the aforementioned N-channel voltage compression circuit 102, a Gilbert cell 105 for performing multiplication on the basis of the outputs from the aforementioned first voltage converting circuit 103 and second voltage converting circuit 104, a constant-current circuit 107 for outputting a constant drain current Id, and a current converting circuit 106 for converting the value of the drain current Id output by the constant-current circuit 107 on the basis of the values of both input voltage Vin(b) and reference voltage Vref1.

Figure 7:
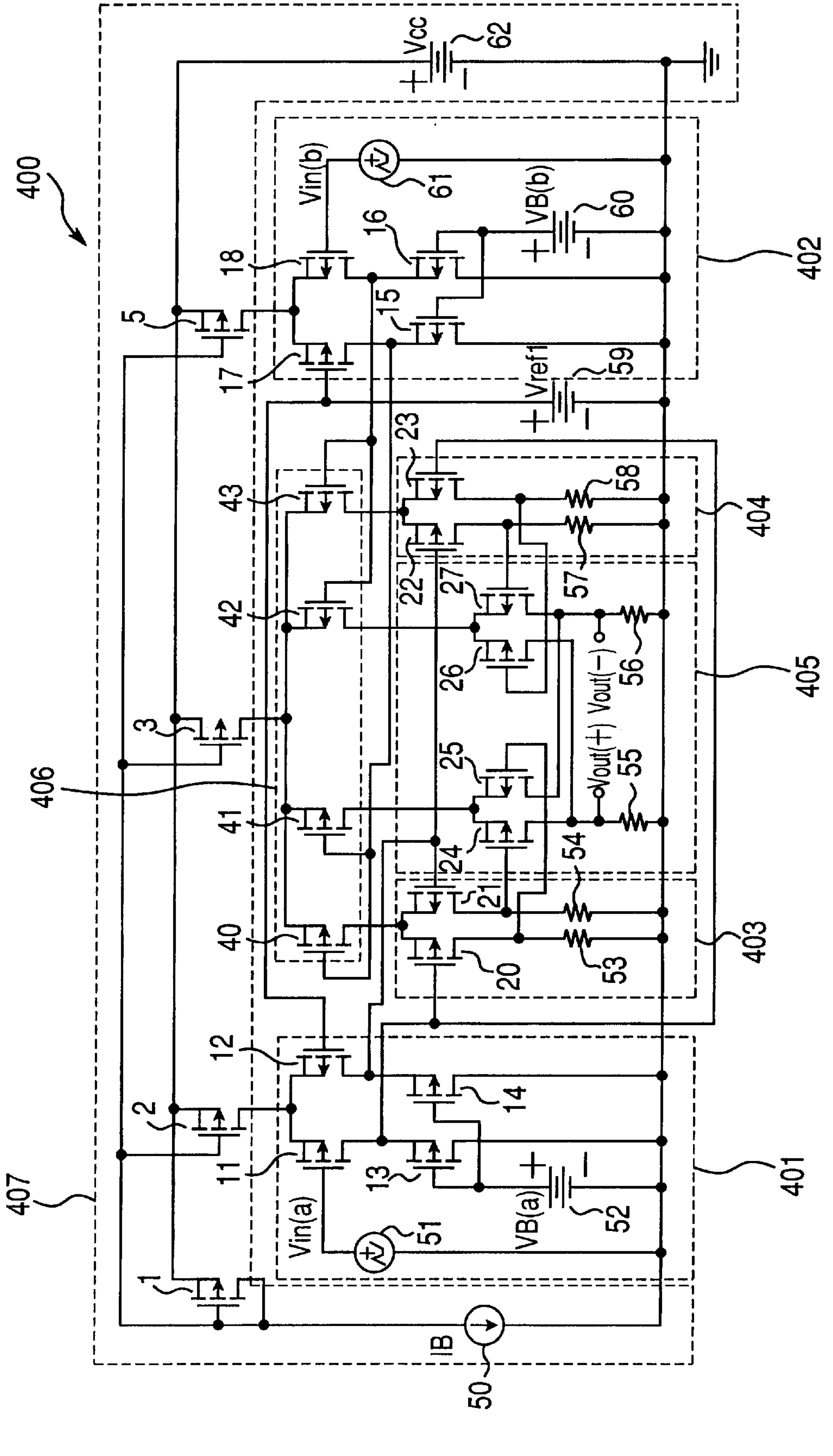
Fig.7 PRIOR ART
FIG. 7 is a circuit diagram of the conventional four quadrant multiplying circuit.

In the diagram, component parts of the four quadrant multiplying circuit 100 of the present invention which are similar to those of the conventional four quadrant multiplying circuit 400 of FIG. 7 are identified by like reference numerals used in FIG. 7, and corresponding circuits are given the same name (for example, P-channel voltage compression circuit, etc.)

In the following description, the gate voltage of a P-channel or N-channel MOSFETn (n: reference number; same applies hereinafter) is expressed as $Vg_n$; the source voltage thereof is expressed as Vs,; the gate-source voltage thereof is expressed as $Vgs_n$; and the drain current thereof is expressed as $Id_n$. The threshold voltage of a P-channel MOSFETn is expressed as Vth(P), and the threshold voltage of an N-channel MOSFETn is expressed as $Vth(N)_n$. Moreover, a P-channel MOSFETn is referred to as PMOSn and an N-channel MOSFETn is referred to as NMOSn.

The four quadrant multiplying circuit 100 is characterized in that it comprises an N-channel voltage compression circuit 102 instead of the P-channel voltage compression circuit 402 that is used in the conventional four quadrant multiplying circuit 400 illustrated in FIG. 7 and described in the section on the "Background Art".

By adopting this construction, a voltage higher than the reference voltage Vref1 (=½ Vcc) can be supplied as gate voltages $Vg_{40}$ to $Vg_{43}$ to PMOS 40 to 43, respectively, and a voltage higher than the reference voltage Vref1 (=½ Vcc) can be supplied as gate voltages $Vg_{20}$ to $Vg_{23}$ of PMOS 20 to 23, respectively. Thereby, it is possible to operate PMOS 20 to 23 in the pentode region, even when the power supply voltage Vcc is low. In other words, the four quadrant multiplying circuit 100 can be driven at a low voltage.

The P-channel MOSFETs 11 and 12, P-channel MOSFETs 13 and 14, P-channel MOSFETs 70 and 71, P-channel MOSFETs 72 and 73, P-channel MOSFETs 20 to 23, P-channel MOSFETs 24 to 27, and P-channel MOSFETs 40 to 43, which constitute the four quadrant multiplying circuit 100, are each set to the same channel width W and channel length L.

Figure 8:
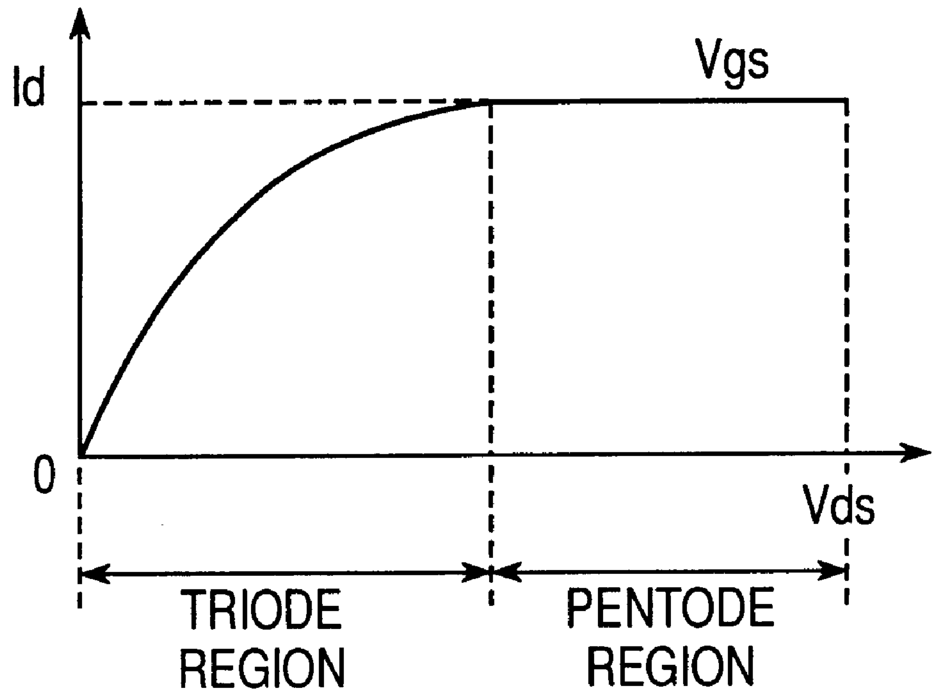
Fig.8 PRIOR ART
FIG. 8 is a diagram illustrating Id–Vd characteristics of a MOS field-effect transistor.

Furthermore, it is known that if PMOSn and NMOSn satisfy the relationship $|Vds_n| \geqq |Vgs_n| - |Vth(P)_n \text{ or } Vth(N)_n|$, then they will operate in the pentode region (see FIG. 8), satisfying the following relationship represented by the equation (1).

$$Id_n = \frac{\beta}{2}\{Vgs_n - (Vth(P)_n \text{ or } Vth(N)_n)\}^2 \tag{1}$$

In the equation (1) above, the coefficient β is a value defined by W/L·μ·$C_0$ (where W is the channel width, L is the channel length, $C_0$ is the capacitance of the gate oxide film per unit surface area, and μ is the channel mean potential mobility). The same applies hereinafter.

Moreover, if PMOSn and NMOSn satisfy the relationship $|Vds_n| < |Vgs_n - |Vth(P)_n \text{ or } Vth(N)_n|$, then they will operate in the triode region (see FIG. 8), satisfying the following relationship represented by the equation (2).

$$Id_n = \beta\left[\{Vgs_n - (Vth(P)_n \text{ or } Vth(N)_n)\} \cdot Vds_n - \frac{Vds_n^2}{2}\right] \tag{2}$$

(1-2) Constant-current Circuit

The constant-current circuit 107 outputs uniform drain currents $ld_2$, $ld_3$ and $Id_5$ respectively to the P-channel voltage compression circuit 101, voltage converting circuit 106 and N-channel voltage compression circuit 102 as will be described below.

The constant-current circuit 107 is constituted by PMOS 1, 2, 3 and 5, a constant-current supply 50 and a DC power supply 62. The gate and drain of PMOS 1, and the gates of PMOS 2, 3 and 5 are connected to the constant-current supply 50 which outputs a bias current IB. The sources of PMOS 1, 2, 3 and 5 are connected to a DC power supply 62 which outputs a power supply voltage Vcc. PMOS 2, 3 and 5 each form a current mirror with PMOS 1, and output constant drain currents $ld_2$, $ld_3$ and $Id_5$ respectively to the P-channel voltage compression circuit 101, current converting circuit 106 and N-channel voltage compression circuit 102.

(1-3) P-channel Voltage Compression Circuit

The P-channel voltage compression circuit 101 is a differential amplifier circuit constituted by PMOS devices, and it converts the input voltage Vin(a) and reference voltage Vref1 to lower values at a specific ratio, thereby reducing the potential difference vin(a) between the aforementioned input voltage Vin(a) and reference voltage Vref1.

The P-channel voltage compression circuit 101 is constituted by PMOS 11, 12, 13 and 14, an input signal source 51, and power supplies 52 and 59. The sources of PMOS 11 and 12 are both connected to the drain of PMOS 2. The gate of PMOS 11 is connected to the input signal source 51, which outputs a voltage Vin(a) as an input signal. The drain of PMOS 11 is connected to the source of PMOS 13. The gate of PMOS 12 is connected to the power supply 59 which outputs reference voltage Vref1. The gates of PMOS 13 and 14 are connected to power supply 52 which outputs a bias voltage VB(a). The drains of PMOS 13 and 14 are earthed.

Since the drain current $ld_2$ of PMOS 2 is a constant current, the total of the drain current $Id_2$ of PMOS 11 and the drain current $Id_{12}$ of PMOS 12 is equal to $ld_2$ at all times. The voltage Vin(a) which is supplied as an input signal to the gate of PMOS 11 has a predetermined potential difference vin(a) with respect to the reference voltage Vref1 supplied to the gate of PMOS 12. The source voltage $Vs_1$ of PMOS 11 and the source voltage $Vs_{12}$ of PMOS 12 are the same, and therefore a potential difference of vin(a) is produced between the gate-source voltage $Vgs_{11}$ of PMOS 11 and the gate-source voltage $Vgs_{12}$ of PMOS 12.

As described above, PMOS 11 and PMOS 12 are set to the same channel width W and channel length L. Therefore, a difference is produced between the drain current $Id_{11}$ of PMOS 11 and drain current $Idl_{12}$ or PMOS 12 in direct proportion to the potential difference generated between the gate-source voltage $Vgs_{11}$ of PMOS 11 and the gate-source voltage $Vgs_{12}$ of PMOS 12. For example, if the gate-source voltage $Vgs_{11}$ of PMOS 11 is smaller than the gate-source voltage $Vgs_{12}$ of PMOS 12, then the drain current $Id_{11}$ of PMOS 11 will decrease and the drain current $Id_{12}$ of PMOS 12 will increase.

The difference between drain current $ld_{12}$ and $Id_{11}$ is expressed by the following equation (3).

$$Id_{12} - Id_{11} \approx \sqrt{\beta_{11} \text{ or } \beta_{12}} \cdot \sqrt{Id_2} \cdot vin(a) \tag{3}$$

The gate voltage $Vg_{13}$ of PMOS 13 is equal to the bias voltage VB(a) supplied by power supply 52, and its source voltage $Vs_{13}$ is equal to $VB(a)+Vgs_{13}$.

From the equation (1) above, when $\beta_{13}$ and $Vth(P)_{13}$ are constant, then if the drain current $ld_{11}$ of PMOS 11 decreases, the gate-source voltage $Vgs_{13}$ of PMOS 13 will fall in proportion to the square root thereof. Similarly, from the equation (1), when $\beta_{14}$, and $Vth(P)_{14}$ are constant, then if the drain current $ld_{12}$ of PMOS 12 decreases, the gate-source voltage $Vgs_{14}$ of PMOS 14 will fall in proportion to the square root thereof.

By adopting the foregoing construction, in the P-channel voltage compression circuit 101, it is possible to generate a voltage corresponding to the value of vin(a), between the source voltage $Vs_{13}$ of PMOS 13 and the source voltage $Vs_{14}$ of PMOS 14. The value of this voltage can be approximated by means of the following equation (4).

$$Vs_{14} - Vs_{13} \approx \sqrt{\frac{\beta_{11} \text{ or } \beta_{12}}{\beta_{13} \text{ or } \beta_{14}}} \cdot vin(a) \tag{4}$$

Here, $\beta_{13}$ and $\beta_{14}$ are set to higher values than $\beta_{11}$ and $\beta_{12}$. Thereby, it is possible to obtain an output wherein the potential difference vin(a) between the aforementioned input voltage Vin(a) and reference voltage Vref1 is reduced. In the case described above, it is necessary for the relationship represented by the following equation (5) to be satisfied, in order that PMOS 11 operates in the pentode region.

$$Vs_{13} - Vth(p)_{11} < Vg_{11} = Vref1 + vin(a) \tag{5}$$

Moreover, in order that PMOS 12 operates in the pentode region, it is necessary to satisfy the relationship expressed by the following equation (6).

$$Vs_{14} - Vth(p)_{12} < Vgs_{12} = Vref1 \tag{6}$$

(1-4) N-channel Voltage Compression Circuit

The N-channel voltage compression circuit 102 is a differential amplifier circuit constituted by NMOS devices, and it reduces the values of input voltage Vin(b) and reference voltage Vref1 by a specific ratio, thereby reducing the potential difference vin(b) between the aforementioned input voltage Vin(b) and reference voltage Vref1.

The N-channel voltage compression circuit 102 is constituted by NMOS 70, 71, 72, 73, 74 and 75, power sources 59 and 60 and an input signal source 61. The drains of NMOS 70 and 71 are connected to power supply 62 which outputs a power supply voltage Vcc, and their gates are connected to power supply 60 which outputs a bias voltage VB(b). The source of NMOS 70 is connected to the drain of NMOS 72. The source of NMOS 71 is connected to the drain of NMOS 73. The gate of NMOS 72 is connected to the power supply 59, which outputs the reference voltage Vref1. The gate of NMOS 73 is connected to the input supply source 61 which outputs Vin(b) as an input signal. The sources of NMOS 72 and 73 are both connected to the drain of NMOS 74.

The gate of NMOS 74 and the drain and gate of NMOS 75 are connected to the drain of PMOS 5 and input the constant drain current $Id_5$. NMOS 74 and 75 form a current mirror, and NMOS 74 outputs a constant drain current $ld_{74}$ to the sources of NMOS 72 and 73.

Since the drain current $ld_{74}$ is a constant current, the total of the drain current $ld_{72}$ of NMOS 72 and the drain current ld73 of NMOS 73 is $ld_{74}$ at all times. The input voltage Vin(b) applied to the gate of NMOS 73 has a predetermined potential difference of vin(b) with respect to the reference voltage Vref1 supplied to the gate of NMOS 72. Since the source voltage $Vs_{72}$ of NMOS 72 and the source voltage $Vs_{73}$ of NMOS 73 are the same, a potential difference of vin(b) is produced between the gate-source voltage $Vgs_{72}$ of NMOS 72 and the gate-source voltage $Vgs_{73}$ of NMOS 73.

As stated previously, NMOS 72 and NMOS 73 are set to the same channel width W and channel length L. Therefore, a difference is produced between the drain current $ld_{72}$ of NMOS 72 and the drain current $ld_{73}$ of NMOS 73 in direct proportion to the potential difference vin(b) generated between the gate-source voltage $Vgs_{72}$ of NMOS 72 and the gate-source voltage $Vgs_{73}$ of NMOS 73. For example, if the gate-source voltage $Vgs_{72}$ of NMOS 72 is smaller than the gate-source voltage $Vgs_{73}$ of NMOS 73, then the drain current $ld_{72}$ of NMOS 72 will fall and the drain current of $ld_{73}$ of NMOS 73 will increase.

The difference between drain current $ld_{73}$ and drain current $ld_{72}$ can be expressed by the following equation (7).

$$Id_{73} - Id_{72} \approx \sqrt{\beta_{72} \text{ or } \beta_{73}} \cdot \sqrt{Id_{74}} \cdot vin(b) \tag{7}$$

The gate voltage $Vg_{70}$ of NMOS 70 is equal to the bias voltage VB(b) supplied by power supply 60, and its source voltage $Vs_{70}$ may be expressed as $VB(b)-Vgs_{70}$. As can be seen from the equation (1) above, when $\beta_{72}$ and $Vth(N)_{72}$ are constant, if the drain current $ld_{72}$ of NMOS 72 declines, then the gate-source voltage $Vgs_{70}$ will fall in proportion to the square root of the drain current $ld_{72}$. Similarly, from the equation (1) above, when $\beta_{71}$ and $Vth(N)_{71}$ are constant, then the source voltage $Vs_{71}$ of NMOS 71 is expressed by $VB(b)-Vgs_{71}$, and if the drain current $ld_{73}$ of NMOS 73 declines, then the gate-source voltage $Vgs_{71}$ of NMOS 71 will fall in proportion to the square root of the drain current $ld_{73}$.

By adopting the foregoing construction, in the N-channel voltage compression circuit 102, a voltage which is directly proportional to vin(b) is generated between the source voltage $Vs_{70}$ of NMOS 70 and the source voltage $Vs_{71}$ of NMOS 71. The difference between source voltage $Vs_{70}$ and source voltage $Vs_{71}$ may be expressed by the approximation in the following equation (8).

$$Vs_{70} - Vs_{71} \approx \sqrt{\frac{\beta_{72} \text{ or } \beta_{73}}{\beta_{70} \text{ or } \beta_{71}}} \cdot vin(b) \tag{8}$$

Here, $\beta_{70}$ and $\beta_{71}$ are set to larger values than $\beta_{72}$ and $\beta_{73}$. Thereby, it is possible to obtain an output wherein the potential difference vin(b) between the input voltage Vin(b) and the reference voltage Vref1 is compressed. In this case, in order for NMOS 73 to operate in the pentode region, the following equation (9) must be satisfied.

$$Vs_{71} + Vth(n)_{73} > Vg_{73} = Vref1 + vin(b) \quad (9)$$

Moreover, in order that NMOS 72 operates in the pentode region, the following equation (10) must be satisfied.

$$Vs_{70} + Vth(n)_{72} > Vgs_{72} = Vref1 \quad (10)$$

(1-5) Current Converting Circuit

The current converting circuit 106 converts and outputs the constant drain current $Id_3$ input from the constant-current circuit 107, on the basis of the compressed input voltage Vin(b) and reference voltage Vref1 output from the aforementioned N-channel voltage compression circuit 102. This current converting circuit 106 is constituted by PMOS 40 to 43. The source of NMOS 70 is connected to the gates of PMOS 40 and 41. The source of NMOS 71 is connected to the gates of PMOS 42 and 43.

Moreover, the sources of PMOS 40 to 43 are all connected to the drain of PMOS 3 in the constant-current circuit 107. PMOS 3 supplies a constant drain current $Id_3$ to PMOS 40 to 43. If the input voltage Vin(b) is input to the gate of PMOS 73, the gate voltage $Vg_{42}$ of PMOS 42 and the gate voltage $Vg_{43}$ of PMOS 43 fall, and the gate voltage $Vg_{40}$ of PMOS 40 and the gate voltage $Vg_{41}$ of PMOS 41 rise. Correspondingly, there is an increase in the gate-source voltage $Vgs_{42}$ of PMOS 42 and the gate-source voltage $Vgs_{43}$ of PMOS 43, and a fall in the gate-source voltage $Vgs_{40}$ of PMOS 40 and the gate-source voltage $Vgs_{41}$ of PMOS 41. As a result of this, a large amount of the drain current $Id_3$ supplied by PMOS 3 flows to PMOS 42 and 43.

Furthermore, since the channel width W and channel length L of PMOS 40 to 43 are set respectively to the same values, the drain currents $Id_{40}$ and $Id_{41}$ of PMOS 40 and 41 are equal. The drain currents $Id_{42}$ and $Id_{43}$ of PMOS 42 and 43 are also equal.

For the foregoing reasons, the drain currents $Id_{40}$ to $Id_{43}$ of PMOS 40 to 43 change in accordance with the input voltage Vin(b). The difference between the drain currents $Id_{42}$ or $Id_{43}$ and drain currents $Id_{40}$ or $Id_{41}$ may be expressed by the following equation (11).

$$Id_{43} - Id_{40} \approx \sqrt{\beta_{40} \text{ or } \beta_{43}} \cdot \sqrt{\frac{Id_3}{2}} \cdot (Vs_{70} - Vs_{71}) \quad (11)$$

(1-6) First Voltage Converting Circuit

The first voltage converting circuit 103 is a differential amplifier circuit and is constituted by PMOS 20 and 21 and diffused resistances 53 and 54. The sources of PMOS 20 and 21 are connected to the drain of PMOS 40, which forms the current converting circuit 106. The gate of PMOS 20 is connected to the drain of PMOS 11 of the P-channel voltage compression circuit 101 and the source of PMOS 13, and a voltage of the same potential as the source voltage $Vs_{13}$ of PMOS 13 is applied thereto. The drain of PMOS 20 is connected to the diffused resistance 53 and the gate of PMOS 25.

The gate of PMOS 21 is connected to the drain of PMOS 12 of the P-channel voltage compression circuit 101 and the source of PMOS 14, and a voltage of the same potential as the source voltage $Vs_{14}$ of PMOS 14 is applied thereto. The drain of PMOS 21 is connected to diffused resistance 54 and the gate of PMOS 24.

As described above, in the P-channel voltage compression circuit 101, the source voltage $Vs_{13}$ of PMOS 13 declines with respect to the input of input voltage Vin(a) (=Vref1+vin(a)), and the source voltage $Vs_{14}$ of PMOS 14 increases. In other words, the gate voltage $Vg_{20}$ of PMOS 20 decreases and the gate voltage $Vg_{21}$ of PMOS 21 increases. Since the source voltage $Vs_{20}$ of PMOS 20 and the source voltage $Vs_{21}$ of PMOS 21 have the same value, the gate-source voltage $Vgs_{20}$ of PMOS 20 increases, and its drain current $Id_{20}$ rises. Furthermore, the gate-source voltage $Vgs_{21}$ of PMOS 21 declines, and its drain current $Id_{21}$ falls. The difference between drain current $Id_{20}$ and drain current $Id_{21}$ may be expressed the approximation in the following equation (12).

$$Id_{20} - Id_{21} \approx \sqrt{\beta_{20} \text{ or } \beta_{21}} \cdot \sqrt{Id_{40}} \cdot (Vs_{14} - Vs_{13}) \quad (12)$$

The drain of PMOS 20 is connected to the gate of diffused resistance 53 and the gate of PMOS 25, and all of the drain current $Id_{20}$ flows to diffused resistance 53. Consequently, the drain voltage $Vd_{20}$ increases as the drain current $Id_{20}$ increases. Moreover, the drain of PMOS 21 is connected to the diffused resistance 54 and the gate of PMOS 24, and all of the drain current $Id_{21}$ flows to diffused resistance 54. Consequently, the drain voltage $Vd_{21}$ falls as the drain current $Id_{21}$ falls.

The foregoing relationship may be expressed by the following equation (13) which is obtained by rearranging equation 12. In the equation (13), the resistance values of diffused resistances 53 and 54 are expressed by R53 and R54, respectively.

$$Vg_{25} - Vg_{24} = (Id_{20} - Id_{21}) \times (R53 \text{ or } R54) \quad (13)$$

(1-7) Second Voltage Converting Circuit

The second voltage converting circuit 104 is a differential amplifier circuit, and it is constituted by PMOS 22 and 23 and diffused resistances 57 and 58. The sources of PMOS 22 and 23 are connected to the drain of PMOS 43 which forms current converting circuit 106. The gate of PMOS 22 is connected to the drain of PMOS 12 of the P-channel voltage compression circuit 101 and the source of PMOS 14, and a voltage of the same potential as the source voltage $Vs_{14}$ of PMOS 14 is applied thereto. The drain of PMOS 22 is connected to the gate of PMOS 27 and the diffused resistance 57.

The gate of PMOS 23 is connected to the drain of PMOS 11 in the P-channel voltage compression circuit 101 and to the source of PMOS 13, and a voltage of the same potential as the source voltage $Vs_{13}$ of PMOS 13 is applied thereto. The drain of PMOS 23 is connected to the gate of PMOS 26 and the diffused resistance 58.

As stated previously, in the P-channel voltage compression circuit 101, the source voltage $Vs_{13}$ of PMOS 13 decreases with respect to the input voltage Vin(a), and the source voltage $Vs_{14}$ of PMOS 14 increases. In other words, the gate voltage $Vg_{23}$ of PMOS 23 falls and the gate voltage $Vg_{22}$ of PMOS 22 increases. Since the source voltage $Vs_{22}$ of PMOS 22 and the source voltage $Vs_{23}$ of PMOS 23 have the same value, the gate-source voltage $Vgs_{23}$ of PMOS 23 increases and the drain current $Id_{23}$ increases. Furthermore, the gate-source voltage $Vgs_{22}$ of PMOS 22 declines and the drain current $Id_{22}$ falls. The difference between the drain current $Id_{22}$ and drain current $Id_{23}$ can be found by the following equation (14).

$$Id_{23} - Id_{22} \approx \sqrt{\beta_{22} \text{ or } \beta_{23}} \cdot \sqrt{Id_{43}} \cdot (Vs_{14} - Vs_{13}) \quad (14)$$

The drain of PMOS 23 is connected to diffused resistance 58 and the gate of PMOS 26, and all of drain current $ld_{23}$ flows to diffused resistance 58. Therefore, the drain voltage $Vd_{23}$ of PMOS 23 increases as the drain current $ld_{23}$ increases. Moreover, the drain of PMOS 22 is connected to diffused resistance 57 and the gate of PMOS 27, and all of drain current $ld_{22}$ flows to diffused resistance 57. Consequently, the drain voltage $Vd_{22}$ of PMOS 22 increases as the drain current $ld_{22}$ increases.

The foregoing relationships may be expressed by the following equation (15) which is obtained by rearranging the equation (14). In the equation (15), the resistance value of diffused resistances 57 and 58 are expressed by R57 and R58.

$$Vg_{26} - Vg_{27} = (Id_{23} - Id_{22}) \times (R57 \text{ or } R58) \quad (15)$$

(1-8) Gilbert Cell

Gilbert cell 105 is a section where the multiplying operation is actually carried out, and it is constituted by PMOS 24, 25, 26 and 27 and diffused resistances 55 and 56.

The sources of PMOS 24 and 25 are connected to the drain of PMOS 41 of the current converting circuit 106. The gate of PMOS 24 is connected to the drain of PMOS 21 of the first voltage converting circuit 103. The drain of PMOS 24 is connected to diffused resistance 55 and the drain of PMOS 26. The gate of PMOS 25 is connected to the drain of the first voltage converting circuit 103. The sources of PMOS 26 and 27 are connected to the drain of PMOS 42 which constitutes the current converting circuit 106. The gate of PMOS 26 is connected to the drain of PMOS 23 in the second voltage converting circuit 104, and the gate of PMOS 27 is connected to the drain of PMOS 22 in the second voltage converting circuit 104. The drain of PMOS 27 is connected to diffused resistance 56 and the drain of PMOS 25.

The drain current $Id_{41}$ of PMOS 41 varies in accordance with the value of the input voltage Vin(b). If the drain voltage $Vd_{20}$ of PMOS 20 becomes large, then the gate-source voltage $Vgs_{25}$ of PMOS 25 falls and the drain current $ld_{25}$ declines. The drain of PMOS 25 is connected to diffused resistance 56 and all of drain current $ld_{25}$ flows to diffused resistance 56. If the drain voltage $Vd_{20}$ of PMOS 20 falls, then the gate-source voltage $Vgs_{25}$ of PMOS 25 increases and the drain current $ld_{25}$ rises.

Furthermore, the drain of PMOS 24 is connected to the diffused resistance 55, and all of the drain current $ld_{24}$ flows to diffused resistance 55. If the drain voltage $ld_{21}$ of PMOS 21 falls, then the gate-source voltage $Vgs_{24}$ of PMOS 24 increases and the drain current $ld_{24}$ increases. The difference between the drain current $ld_{24}$ of PMOS 24 and the drain current $ld_{25}$ of PMOS 25 can be found from the following equation (16).

$$Id_{24} - Id_{25} \approx \sqrt{\beta_{24} \text{ or } \beta_{25}} \cdot \sqrt{Id_{41}} \cdot (Vg_{25} - Vg_{24}) \quad (16)$$

The drain current $Id_{42}$ of PMOS 42 changes in accordance with the value of the input voltage Vin(b). If the drain voltage $Vd_{23}$ of PMOS 23 increases, then the gate-source voltage $Vgs_{26}$ of PMOS 26 will fall and the drain current $ld_{26}$ will fall. The drain terminal of PMOS 26 is connected to diffused resistance 55 and all of the drain current $Id_{26}$ flows to diffused resistance 55. If the drain voltage $Vd_{23}$ of PMOS 23 falls, then the gate-source voltage $Vgs_{26}$ of PMOS 26 increases and the drain current $Id_{26}$ increases.

The drain of PMOS 27 is connected to the diffused resistance 56 and all of its drain current $ld_{27}$ flows to diffused resistance 56. If the drain voltage $Vd_{22}$ of PMOS 22 falls, then the gate-source voltage $Vgs_{27}$ of PMOS 27 rises and the drain current $ld_{27}$ rises. The difference between the drain current $Id_{26}$ of PMOS 26 and the drain current $Id_{27}$ of PMOS 27 can be derived from the following equation (17).

$$Id_{27} - Id_{26} \approx \sqrt{\beta_{27} \text{ or } \beta_{26}} \cdot \sqrt{Id_{42}} \cdot (Vg_{26} - Vg_{27}) \quad (17)$$

can be seen from the foregoing description, the drain current $ld_{24}$ of PMOS 24 and the drain current $ld_{26}$ of PMOS 26 flow to diffused resistance 55, and the drain current $ld_{27}$ of PMOS 27 and the drain current $Id_{25}$ of PMOS 25 flow to diffused resistance 56. The difference between the output voltage Vout(+) in the aforementioned diffused resistance 55 and the output voltage Vout(−) in diffused resistance 56 forms the output of the four quadrant multiplying circuit 100.

Here, the coefficient β for PMOS 11 and 12 is expressed as β1, β for PMOS 13 and 14 is expressed as β2, β for PMOS 72 and 73 is expressed as β3, β for PMOS 70 and 71 is expressed as β4, β for PMOS 20–23 is expressed as β5, β for PMOS 24–27 is expressed as β6, and β for PMOS 40–43 is expressed as β7. Moreover, the drain current $ld_2$ of PMOS 2 is expressed as I1, the drain current $ld_{74}$ of NMOS 74 is expressed as I2, the half-value of drain current $ld_3$ of PMOS is expressed as I3, the drain current $ld_{40}$ of PMOS 40 and the drain current $ld_{41}$ of PMOS 41 are expressed as I4, and the drain current $ld_{42}$ of PMOS 42 and the drain current $ld_{43}$ of PMOS 43 are expressed as I5.

Furthermore, if the resistance value of diffused resistances 53, 54, 57, 58 is expressed as Rx and the resistance value of diffused resistances 55 and 56 is expressed as Ry, then the potential difference between the aforementioned output voltages Vout(+) and Vout(−) is given by the following equation (18).

$$\begin{aligned} Vout(-) - Vout(+) &= (Id_{27} + Id_{25}) \cdot R56 - (Id_{26} + Id_{24}) \cdot R55 \quad (18) \\ &= \sqrt{\beta 5} \cdot \sqrt{\beta 6} \cdot \sqrt{\beta 7} \cdot \sqrt{\frac{\beta 1}{\beta 2}} \cdot \sqrt{\frac{\beta 3}{\beta 4}} \cdot \\ &\quad Rx \cdot Ry \cdot \sqrt{I3} \cdot vin(a) \cdot vin(b) \end{aligned}$$

As shown in the equation (18) above, the output potential difference is a value which is directly proportional to the product of vin(a) and vin(b).

(1-9) Low-voltage Drive of Four Quadrant Multiplying Circuit

In order that the four quadrant multiplying circuit 100 of the construction described above functions correctly, it is necessary for each MOSFET to operate in the pentode region.

From the equation (10) above, if NMOS 72 is operating in the pentode region, then a voltage higher than Vref1−Vth $(N)_{40\ or\ 41}$ is applied to the gates of PMOS 40 and 41. Therefore, the drain voltage $Vd_{40}$ of NMOS 40, in other words, the source voltages $Vs_{20}$, $Vs_{21}$ of PMOS 20 and 21, has a higher value than $Vg_{40}+Vth(N)_{40}=Vref1$.

From the equation (9) above, if NMOS 73 operates in the pentode region, then a voltage greater than $Vin(b)-Vth(N)_{42\ or\ 43}$ is applied to the gates of PMOS 42 and 43. Therefore, the drain voltage $d_{40}$ of PMOS 43, in other words, the source voltages $Vs_{20}$, $Vs_{21}$ of PMOS 22, 23, takes a value higher than $Vg_{43}+Vth(N)_{43}=Vin(b)=Vref1+vin(b)$.

From the equation (5) above, if PMOS 11 operates in the pentode region, then a voltage lower than $Vin(a)+Vth(P)_{11}$ is applied to the gates of PMOS 20 and 23.

From the equation (6) above, if PMOS 12 is operating in the pentode region, then a voltage lower than $Vref1+Vth(P)_{12}$ is applied to the gates of PMOS 21 and 22.

As can be seen from the foregoing, in the four quadrant multiplying circuit 100, even if the reference voltage Vref1 (=½ Vcc) is set to a low value, it is possible to make the gate-source voltages $Vgs_{20}$ to $Vgs_{23}$ of PMOS 20 to 23 higher than their threshold voltages $Vth(P)_{20}$ to $Vth(P)_{23}$, and therefore PMOS 20 to 23 can be operated in the pentode region. In other words, the four quadrant multiplying circuit 100 can be driven at a low power supply voltage Vcc compared to a conventional four quadrant multiplying circuit (for example, the four quadrant multiplying circuit 400 illustrated in FIG. 7).

(1-10) Modified Four Quadrant Multiplying Circuit

Figure 3:
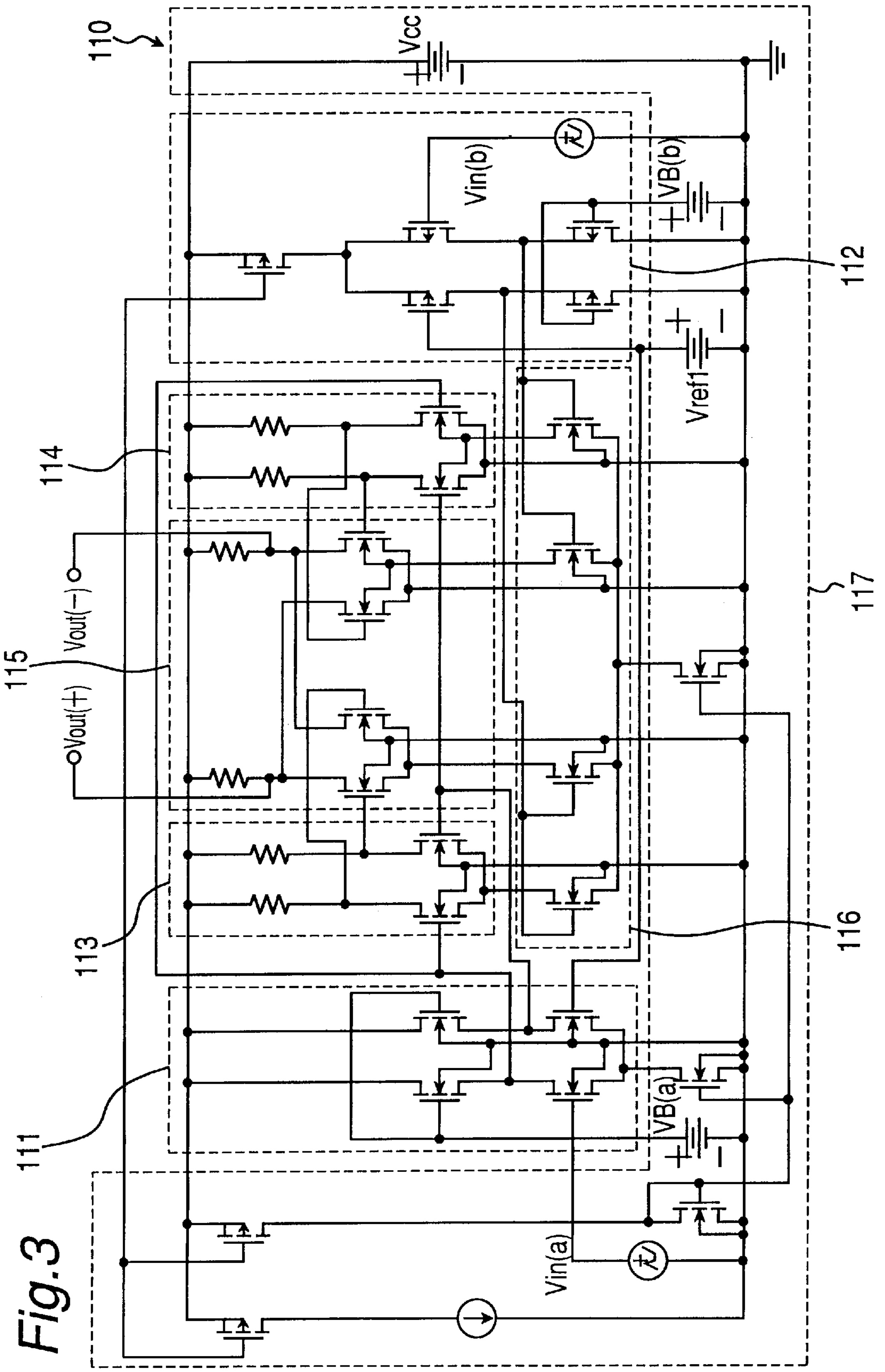
FIG. 3 is a circuit diagram of a modification of the four quadrant multiplying circuit according to the first embodiment.

As is clear to anyone working in this field, similar results can be obtained by exchanging the positions of the PMOS and NMOS devices in the four quadrant multiplying circuit 100. FIG. 3 illustrates a circuit diagram of a four quadrant multiplying circuit 110 wherein the PMOS and NMOS devices in four quadrant multiplying circuit 100 have been exchanged. The four quadrant multiplying circuit 110 comprises an N-channel voltage compression circuit 111, a P-channel voltage compression circuit 112, a first voltage converting circuit 113, a second voltage converting circuit 114, a Gilbert cell 115, a current converting circuit 116, and a constant-current circuit 117.

In the four quadrant multiplying circuit 110, the positions of the PMOS and NMOS devices in the four quadrant multiplying circuit 100 are exchanged, but the basic operation of the circuit is the same as the four quadrant multiplying circuit 100. A voltage lower than reference voltage Vref1 is applied to the source of each of the NMOS devices constituting the first voltage converting circuit 113 and the second voltage converting circuit 114, and a voltage greater than reference voltage Vref1 is applied to the gate of each of the aforementioned NMOS devices.

In other words, even if the reference voltage Vref1 is set to a low value, the gate-source voltage Vgs for each of the NMOS devices constituting the first voltage converting circuit 113 and the second voltage converting circuit 114 can be made large, and each NMOS in the aforementioned first voltage converting circuit 113 and second voltage converting circuit 114 can be operated in the pentode region.

Thereby, the four quadrant multiplying circuit 110 is capable of being driven at a low power supply voltage Vcc compared to a conventional four quadrant multiplying circuit (for example, four quadrant multiplying circuit 400 illustrated in FIG. 7).

Description of the construction and the operation of each circuit constituting the four quadrant multiplying circuit 110 is omitted here for the sake of brevity.

(2) Second Embodiment (2-1) General Construction

The multiplication result in the four quadrant multiplying circuit 100 according to the first embodiment described above is expressed by the difference between output voltages Vout(+) and Vout(−). The potential difference between the aforementioned output voltages Vout(+) and Vout(−) may be expressed by the equation (18) above, but β1−β7 in the equation (18) are defined by $W/L\cdot\mu\cdot C_0$ (where W is the channel width, L is the channel length, $C_0$ is the capacitance per unit surface area of the gate oxide film, and $\mu$ is the channel mean electron mobility). The aforementioned channel mean electron mobility $\mu$ varies with change in the environmental temperature. Here, the effects of the channel mean electron mobility $\mu$ are cancelled out with respect to β1 and β2, and β3 and β4, and hence there is no effect on the value of the output potential difference.

Furthermore, the diffused resistance values Rx, Ry have a process-inherent temperature dependence, and these values vary with change in the environmental temperature. Since the drain current $Id_3$ of PMOS 3 constituting the constant-current circuit 107 is constant, the coefficient β is not affected by temperature change.

In this way, in the aforementioned four quadrant multiplying circuit 100, there was a problem in that the output voltages Vout(+) and Vout(−) vary according to coefficients which are influenced by the environmental temperature, namely, Rx and Ry.

Figure 4:
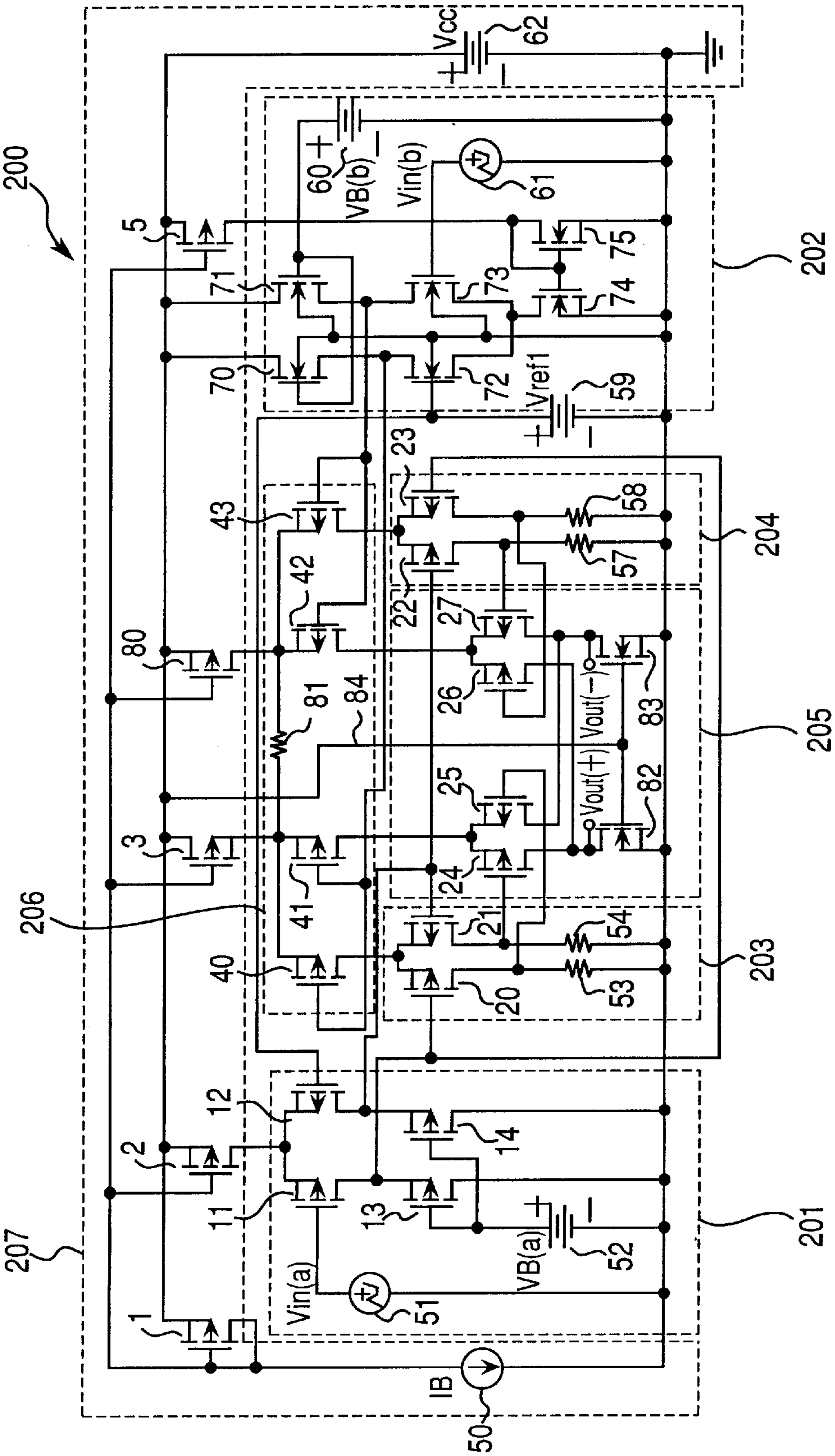
FIG. 4 is a circuit diagram of the four quadrant multiplying circuit according to a second embodiment of the present invention.

The four quadrant multiplying circuit 200 according to the second embodiment is characterized in that a construction which is not affected by environmental temperature change is added to the aforementioned four quadrant multiplying circuit 100. Specifically, FIG. 4 illustrates a circuit diagram of a four quadrant multiplying circuit 200 according to the second embodiment. The same reference labels are given to the same constituent elements as four quadrant multiplying circuit 100 relating to the first embodiment. Furthermore, the same names are given to circuits which correspond to circuits in four quadrant multiplying circuit 100 relating to the first embodiment.

Hence, P-channel voltage compression circuit 201 corresponds to the P-channel voltage compression circuit 101 in four quadrant multiplying circuit 100 described above. N-channel voltage compression circuit 202 corresponds to the N-channel voltage compression circuit in four quadrant multiplying circuit 102 above. First voltage converting circuit 203 corresponds to the first voltage converting circuit 103 in four quadrant multiplying circuit 100 described above. Second voltage converting circuit 204 corresponds to the second voltage converting circuit 104 in four quadrant multiplying circuit 100 described above. Gilbert cell 205 corresponds to the Gilbert cell 105 in four quadrant multiplying circuit 100 described above. Current converting circuit 206 corresponds to current converting circuit 106 in four quadrant multiplying circuit 100 described above. The constant-current circuit 207 corresponds to constant-current circuit 107 in four quadrant multiplying circuit 100 described above.

Figure 1:
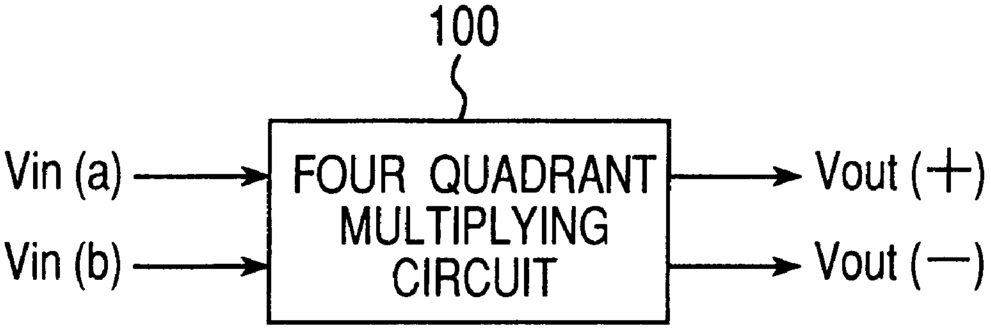
FIG. 1 is a diagram illustrating a four quadrant multiplying circuit.
Figure 2:
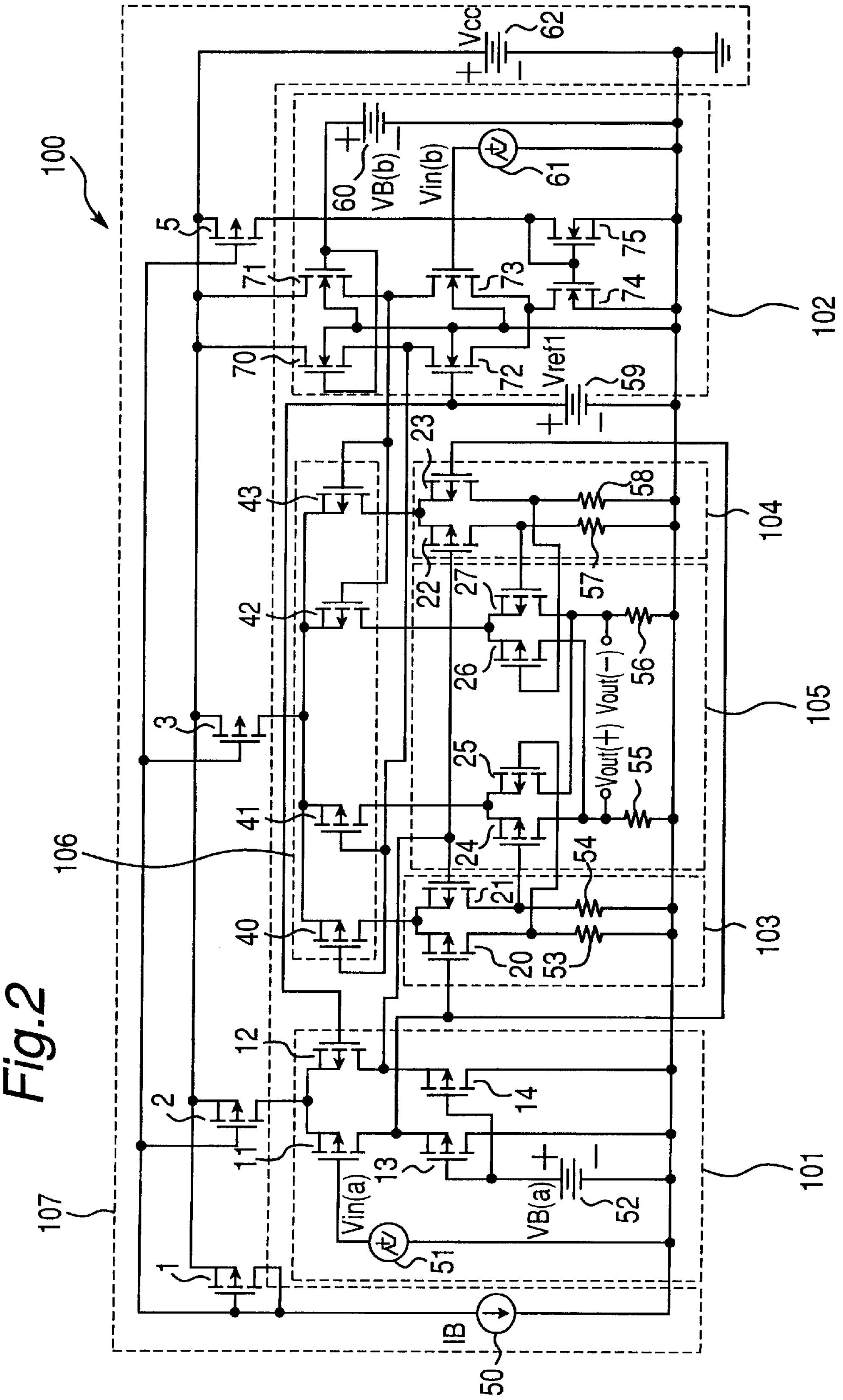
FIG. 2 is a circuit diagram of a four quadrant multiplying circuit according to a first embodiment of the present invention.

The four quadrant multiplying circuit 200 is characterized in that it comprises, additionally, a PMOS 80 of the same gate width W and same gate length L as PMOS 3 in constant-current circuit 107 in the four quadrant multiplying circuit 100 illustrated in FIG. 2, a diffused resistance 81 in current converting circuit 106, and, in place of diffused resistance 55 in Gilbert cell 105, NMOS devices 82 and 83.

Hereinafter, the differences produced with respect to the four quadrant multiplying circuit 100 according to the first embodiment by the aforementioned changes to the circuit construction are described.

The gate of PMOS 80 provided in constant-current circuit 207 is connected to power supply 50, its source is connected to power supply 62 and its drain is connected to the sources of PMOS 42 and 43 and to one end of diffused resistance 81. This diffused resistance 81 is fabricated by the same process as the other diffused resistances 53, 54, 57 and 58, and is designed such that it displays the same temperature characteristics.

The gate of NMOS 82 is connected to the power supply 62, which outputs a power supply voltage Vcc, its source is earthed, and its drain is connected to the drains of PMOS 24 and 26. The gate of NMOS 83 is connected to the power supply 62 outputting power supply voltage Vcc, its source is earthed, and its drain is connected to the drains of PMOS 25 and 27. The gates of PMOS 40 and 41 constituting the current converting circuit 206 are connected to the source of NMOS 7. The gates of PMOS 42 and 43 are connected to the source of NMOS 71. The sources of PMOS 40 and 41 are connected to the drain of PMOS 3 in the constant-current circuit 207. PMOS 3 outputs a uniform drain current $ld_3$ to PMOS 40 and 41 and diffused resistance 80. The sources of PMOS 42 and 43 are connected to the drain of PMOS 80 in the constant-current circuit 207. PMOS 80 outputs a constant drain current $ld_{80}$ to PMOS 42 and 43 and diffused resistance 80.

As described above, if an input voltage Vin(b) is input to the gate of NMOS 73, then the gate voltage $Vg_{42}$ of PMOS 42 and the gate voltage $Vg_{43}$ or PMOS 43 decrease, whilst the gate voltage $Vg_{40}$ of PMOS 40 and the gate voltage $Vg_{41}$ of PMOS 41 increase. The coefficient β of PMOS 40–43 is set previously to a value which satisfies the relationship Id<<β. As can be seen from equation 1 above, if Id<<β, then Vgs≈Vth. In other words, the gate-source voltage $Vgs_{40}$ of PMOS 40 and the gate-source voltage $Vgs_{41}$ of PMOS 41 can be set by approximation to a value equal to $Vth(P)_{40\ or\ 41}$.

The difference between gate voltage $Vg_{40}$ or gate voltage $Vg_{41}$ and gate voltage $Vg_{42}$ or gate voltage $Vg_{43}$ is the difference between source voltage $Vs_{40}$ or source voltage $Vs_{41}$ and source voltage $Vs_{42}$ or source voltage $Vs_{43}$. Here, if the current flowing in diffused resistance 81 is taken as 181, then a current equal to half the value of drain current $ld_3$ minus 18, will flow in PMOS 40 and 41. Moreover, a current equal to half the sum of drain current $ld_{80}$ and $l_{81}$ flows in PMOS 42 and 43. The difference between drain current $ld_{43}$ and drain current $ld_{40}$, for example, may be expressed by the following equation (19).

$$Id_{43} - Id_{40} \approx \frac{Vs_{70} - Vs_{71}}{R81} \tag{19}$$

The drain of PMOS 20 constituting the first voltage converting circuit 203 is connected to the gate of PMOS 25. The sources of PMOS 24 and 25 are connected to the drain of PMOS 41. The PMOS 41 outputs a uniform drain current $ld_{41}$ to PMOS 24 and 25. If the drain voltage $Vd_{20}$ of PMOS 20 increases, then the gate-source voltage $Vgs_{25}$ of PMOS 25 falls and the drain current $ld_{25}$ falls. Since the drain of PMOS 25 is connected to the drain of NMOS 83, all of the drain current $ld_{25}$ flow to NMOS 83. If the drain voltage $Vd_{21}$ of PMOS 21 falls, then the gate-source voltage $Vgs_{24}$ of PMOS 24 increases and the drain current $ld_{24}$ increases. Since the drain of PMOS 24 is connected to the drain terminal of NMOS 82, all of the drain current $ld_{24}$ flows to NMOS 82.

The on resistance $R(on)_{82}$ of NMOS 82 may be expressed by the following equation 20.

$$R(on)_{82} \approx \frac{1}{\beta \times (Vgs_{82} - Vth(N)_{82})} \tag{20}$$

Moreover, the difference between the drain current $ld_{24}$ and drain current $ld_{25}$ may be derived from equation 16 above.

The drain of PMOS 23 is connected to the gate of PMOS 26, and the drain of PMOS 22 is connected to the gate of PMOS 27. The sources of PMOS 26 and PMOS 27 are connected to the drain of PMOS 42. The PMOS 42 outputs a uniform drain current $ld_{42}$. When the drain voltage $Vd_{23}$ of PMOS increases, the gate-source voltage $Vgs_{26}$ of PMOS 26 falls and the drain current $ld_{26}$ falls. The drain of PMOS 26 is connected to the drain of NMOS 82, and therefore all of the drain current id26 flows to NMOS 82. When the drain voltage $Vd_{22}$ of PMOS 22 falls, the gate-source voltage $Vgs_{27}$ of PMOS 27 increases, and the drain current $ld_{27}$ increases. The drain of PMOS 27 is connected to the drain of NMOS 83 and all of the drain current $ID_{27}$ flows to NMOS 83. The on resistance $R(on)_{83}$ of NMOS 83 may be expressed by the following equation (21).

$$R(on)_{83} \approx \frac{1}{\beta \times (Vgs_{83} - Vth(N)_{83})} \tag{21}$$

Moreover, the difference between the drain current $ld_{27}$ and the drain current $ld_{26}$ may be derived by Equation 17 above.

Consequently, drain current $ld_{24}$ and drain current $ld_{26}$ flow to NMOS 82, and drain current $ld_{25}$ and drain current $ld_{27}$ flow to NMOS 83.

Here, if β for NMOS 82 and 83 is expressed as β8, then from the equations (3) to (10), the equations (12) to (17), and the equations (19) to (21) above, the difference between output voltages Vout(−) and Vout(+) may be expressed as the following equation (22).

$$\begin{aligned} Vout(-) - Vout(+) &= (Id_{27} + Id_{25}) \cdot R(on)_{83} - (Id_{26} + Id_{24}) \cdot R(on)_{82} \\ &= \frac{\sqrt{\beta 5} \cdot \sqrt{\beta 6}}{\beta 8 \times \{(Vgs_{82} \text{ or } Vgs_{83}) - (Vth(N)_{82} \text{ or } Vth(N)_{82})\}} \cdot \sqrt{\frac{\beta 1}{\beta 2}} \cdot \sqrt{\frac{\beta 3}{\beta 4}} \cdot \frac{Rx}{R81} \cdot vin(a) \cdot vin(b) \end{aligned} \tag{22}$$

As shown in the equation (22), the channel mean electron mobility $\mu$ components in β5, β6 and β8 cancel each other out. Furthermore, the process-inherent temperature characteristics of diffused resistance RX and diffused resistance R81 also cancel each other out.

As described above, in the four quadrant multiplying circuit 200 according to the second embodiment, it is possible to output stable output voltages Vout(+), Vout(−), which are not affected by changes in environmental temperature.

(2-2) Modified Four Quadrant Multiplying Circuit

Figure 5:
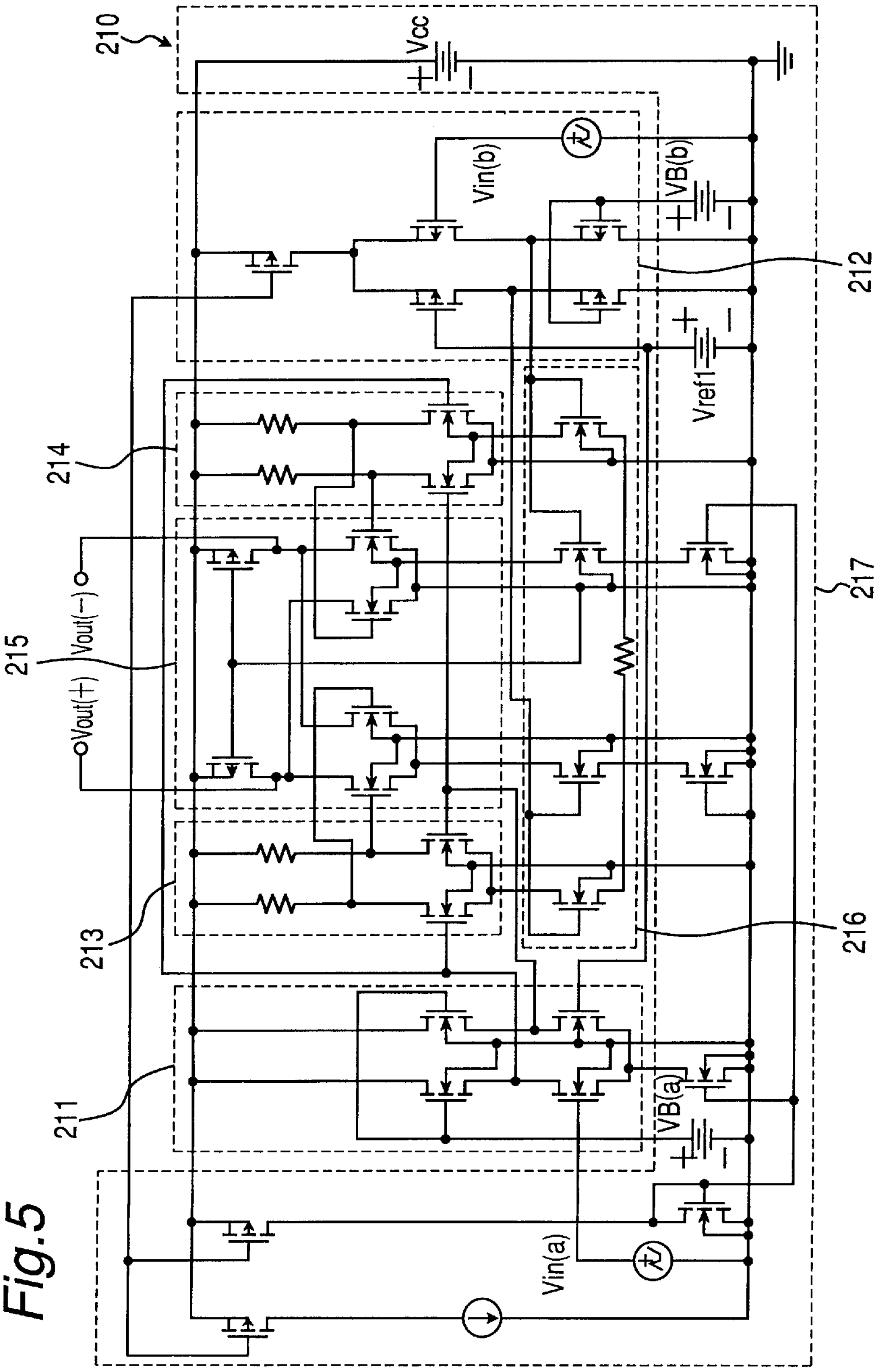
FIG. 5 is a circuit diagram of a modification of the four quadrant multiplying circuit according to the second embodiment.

As is clear to anyone working in this field, similar results can be obtained by exchanging the positions of the PMOS and NMOS devices in the four quadrant multiplying circuit 200 in the second embodiment. FIG. 5 illustrates a circuit diagram of a four quadrant multiplying circuit 210 wherein the PMOS and NMOS devices in four quadrant multiplying circuit 200 are exchanged. The four quadrant multiplying circuit 210 comprises an N-channel voltage compression circuit 211, a P-channel voltage compression circuit 212, a first voltage converting circuit 213, a second voltage converting circuit 214, a Gilbert cell 215, a current converting circuit 216, and a constant-current circuit 217.

In the four quadrant multiplying circuit 210, the PMOS and NMOS devices in four quadrant multiplying circuit 200 are exchanged, and the basic operation of the circuit is the same as the four quadrant multiplying circuit 200. A voltage lower than the reference voltage Vref1 is applied to the source of each of the NMOS devices constituting the first voltage converting circuit 213 and the second voltage converting circuit 214, and a voltage greater than the reference voltage Vref1 is applied to the gates of the aforementioned NMOS devices.

In other words, the four quadrant multiplying circuit 210 can be driven at a low power supply voltage Vcc compared to a conventional four quadrant multiplying circuit (for example, four quadrant multiplying circuit 400 illustrated in FIG. 7).

Similarly to the four quadrant multiplying circuit 200, by nullifying the elements which change in accordance with environmental temperature in the relationship (equation 22) for determining the potential difference between output voltages Vout(+) and Vout(−), it is possible to output stable output voltages Vout(+) and Vout(−) which are unaffected by changes in environmental temperature.

Description of the construction and the operation of the circuits constituting the four quadrant multiplying circuit 210 has been omitted here for the sake of brevity.

(3) Third Embodiment

A four quadrant multiplying circuit 300 according to a third embodiment is characterized in that an independent power supply (90) for supplying a predetermined voltage (reference voltage Vref2) to the gates of NMOS 82 and 83 of four quadrant multiplying circuit 200 relating to the foregoing second embodiment is provided, additionally. By adopting this construction, low-voltage driving becomes possible and, moreover, output voltages Vout(+) and Vout(−) which are stabilized with respect to environmental temperature change or fluctuations in the power supply voltage Vcc can be output.

Figure 6:
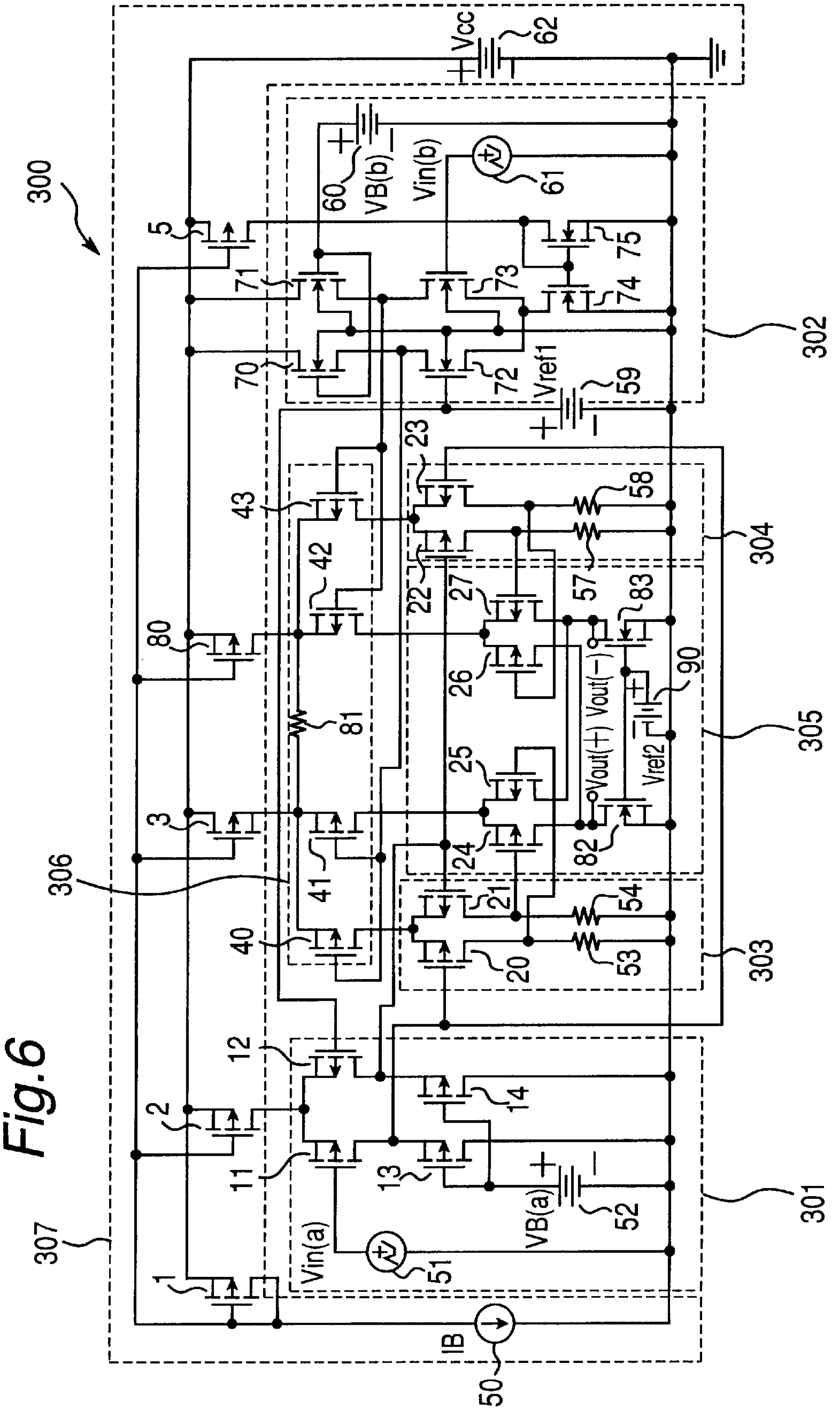
FIG. 6 is a circuit diagram of the four quadrant multiplying circuit according to a third embodiment of the present invention.

FIG. 6 is a circuit diagram of a four quadrant multiplying circuit 300 relating to the third embodiment. The same reference labels are given to the same constituent parts as the four quadrant multiplying circuit 200 relating to the second embodiment described above. Furthermore, the same names are given to circuits which correspond to circuits in the four quadrant multiplying circuit 200 according to the second embodiment above. Hence, the P-channel voltage compression circuit 301 corresponds to the P-channel voltage compression circuit 201 in the four quadrant multiplying circuit 200 described above. The N-channel voltage compression circuit 302 corresponds to the N-channel voltage compression circuit 202 in the four quadrant multiplying circuit 200 described. The first voltage converting circuit 303 corresponds to the first voltage converting circuit 203 in the four quadrant multiplying circuit 200. The second voltage converting circuit 304 corresponds to the second voltage converting circuit 204 in the four quadrant multiplying circuit 200 described above. The Gilbert cell 305 corresponds to the Gilbert cell 205 in the four quadrant multiplying circuit 200 described above. The current converting circuit 306 corresponds to the current converting circuit 206 in the four quadrant multiplying circuit 200 described above. The constant-current circuit 307 corresponds to the constant-current circuit 207 in the four quadrant multiplying circuit 200 above.

The constant-voltage supply 90 is independent from the power supply 62 outputting power supply voltage Vcc, and it supplies a reference voltage Vref2 to the gates of NMOS 82 and 83. A common power supply using a band gap, for example, can be employed as the constant-voltage supply 90. By adopting the foregoing construction, the four quadrant multiplying circuit 300 is able to output stable multiplication results, without being affected by fluctuations in the power supply voltage Vcc output by power supply 62.

Similarly to the four quadrant multiplying circuit 200 in the second embodiment described above, the four quadrant multiplying circuit 300 is capable of being driven at a low voltage and of outputting stable multiplication results, which are unaffected by temperature change in the external environment.

In the four quadrant multiplying circuit according to the present invention, by constituting a first voltage compression circuit by P-channel MOSFETs and a second voltage compression circuit by N-channel MOSFETs, it is possible to increase the gate-source voltage Vgs of the MOSFETs constituting differential amplifier circuits in the first and second voltage converting circuits. Thereby, driving at low voltages becomes possible.

In the four quadrant multiplying circuit according to the present invention, by using diffused resistances as the load resistances in the first and second voltage converting circuits, and by using the MOSFET on resistance as the load resistance for the Gilbert cell, it is possible to eliminate coefficients which are affected by environmental temperature change from the parameters which determine the output voltage of the Gilbert cell. Thereby, it is possible to obtain a stable output which is unaffected by environmental temperature change.

In the present invention, by providing a power supply which applies a predetermined voltage to the gates of the N-channel MOSFETs connected to the Gilbert cell, independently on the other circuitry, it is possible to obtain a stable output which is unaffected by fluctuations in the power supply voltage Vcc.

What is claimed is:

1. A four quadrant multiplying circuit for multiplying a first input voltage and a second input voltage, comprising:

- a first voltage compression circuit, including a differential amplifier circuit comprising transistors of a first conductivity type, for converting a differentially input first input voltage and reference voltage to lower values at a predetermined ratio, reducing the potential difference between said first input voltage and reference voltage and outputting said potential difference;
- a second voltage compression circuit, including a differential amplifier circuit comprising transistors of a second conductivity type, for converting a differentially input second input voltage and the reference voltage to lower values at a second predetermined ratio, reducing the potential difference between said second input voltage and reference voltage and outputting said potential difference;
- a current converting circuit, comprising transistors of the first conductivity type, for outputting a first and a second constant current on the basis of the second input voltage and the reference voltage converted to lower values at the second predetermined ratio output by said second voltage compression circuit;
- a first voltage converting circuit, including a differential amplifier circuit comprising two transistors of the first conductivity type, wherein the first constant current output by said current converting circuit is received by the sources of said two transistors of the first conductivity type of said first voltage converting circuit, the first input voltage after compression output by said first voltage compression circuit is received by the gate of one of the two transistors of the first conductivity type of said first voltage converting circuit, and the reference voltage after compression is received by the gate of the other of the two transistors of the first conductivity type of said first voltage converting circuit;

a second voltage converting circuit, including a differential amplifier circuit comprising two transistors of the first conductivity type, wherein the second constant current output by said current converting circuit is received by the sources of said two transistors of the first conductivity type of said second voltage converting circuit, the first input voltage after compression output by said first voltage compression circuit is received by the gate of one of the two transistors of the first conductivity type of said second voltage converting circuit, and the reference voltage after compression is received by the gate of the other of the two transistors of the first conductivity type of said second voltage converting circuit; and a Gilbert cell for multiplying together the outputs of said first and second voltage converting circuits and outputting the multiplied outputs.

2. The four quadrant multiplying circuit according to claim 1, wherein said first voltage compression circuit comprises a first and a second PMOS, the respective sources of which are connected to a first constant-current supply, the first input voltage is input to the gate of the first PMOS, the source of a third PMOS, of which the drain is earthed and the gate is supplied with a first bias voltage, is connected to the drain of the first PMOS, the reference voltage is input to the gate of the second PMOS, the source of a fourth PMOS, of which the drain is earthed and the gate is supplied with the first bias voltage, is connected to the drain of the second PMOS, and the source voltage of the third PMOS and the source voltage of the fourth PMOS are respectively output as the first input voltage and reference voltage converted to lower values at the first predetermined ratio; said second voltage compression circuit comprises a first and a second NMOS, the respective sources of which are connected to a second constant-current supply, the gate of the first NMOS is connected to receive the reference voltage, the drain of the first NMOS is connected to the source of a third NMOS, of which the gate is supplied with a second bias voltage and the drain is supplied with a first power supply voltage, the second input voltage is input to the gate of the second NMOS, the drain of the second NMOS is connected to the source of a fourth NMOS, of which the gate is supplied with the second bias voltage and the drain is supplied with the first power supply voltage; and the source voltage of the third NMOS and the source voltage of the fourth NMOS are respectively output as the second input voltage and the reference voltage converted to lower values at the second predetermined ratio.

3. The four quadrant multiplying circuit according to claim 1, wherein said first and second voltage converting circuits comprise diffused resistances as load resistances; and said Gilbert cell comprises transistors of the second conductivity type having a predetermined on resistance as load resistances.

4. The four quadrant multiplying circuit according to claim 3, wherein the gates of the transistors of the second conductivity type used as load resistances in said Gilbert cell are provided with a second power supply voltage which supplies a predetermined voltage.

* * * * *